O. J. OAKLEY & E. C. HUGHES.
MACHINE FOR MOLDING ROOFING TILES AND THE LIKE.
APPLICATION FILED JAN. 16, 1918.

1,267,331.

Patented May 21, 1918.
4 SHEETS—SHEET 1.

Inventors
O. J. Oakley
E. C. Hughes

Attorney

O. J. OAKLEY & E. C. HUGHES.
MACHINE FOR MOLDING ROOFING TILES AND THE LIKE.
APPLICATION FILED JAN. 16, 1918.
1,267,331.
Patented May 21, 1918.
4 SHEETS—SHEET 2.
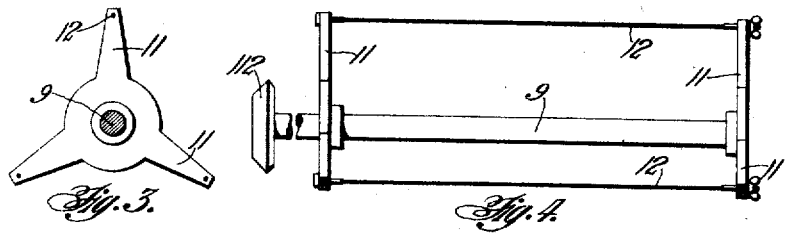
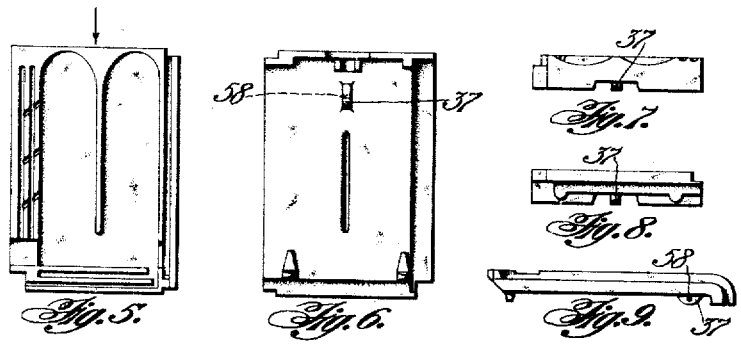
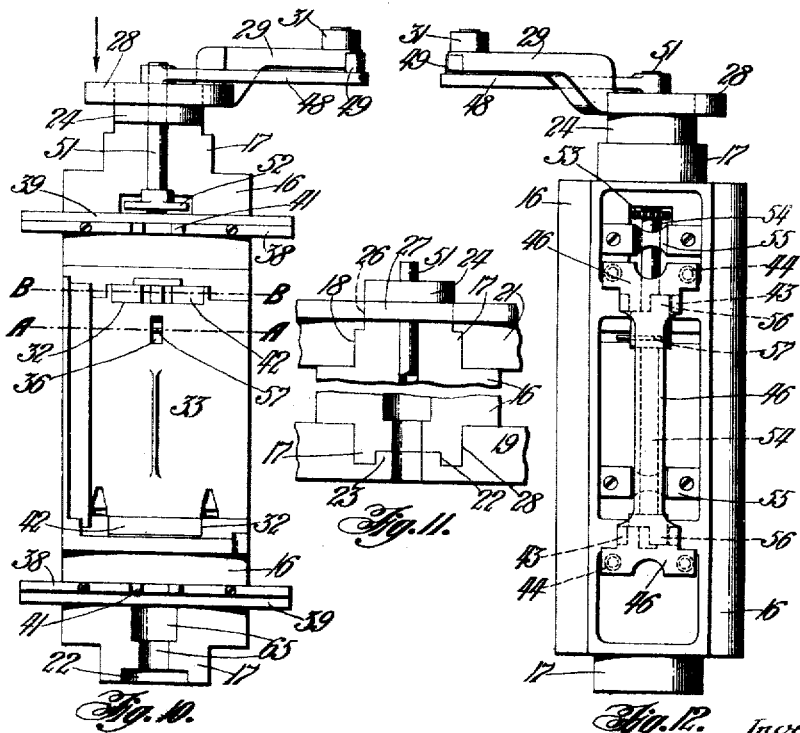
Inventors
O. J. Oakley
E. C. Hughes
Attorney.

O. J. OAKLEY & E. C. HUGHES.
MACHINE FOR MOLDING ROOFING TILES AND THE LIKE.
APPLICATION FILED JAN. 16, 1918.
1,267,331.
Patented May 21, 1918.
4 SHEETS—SHEET 3.
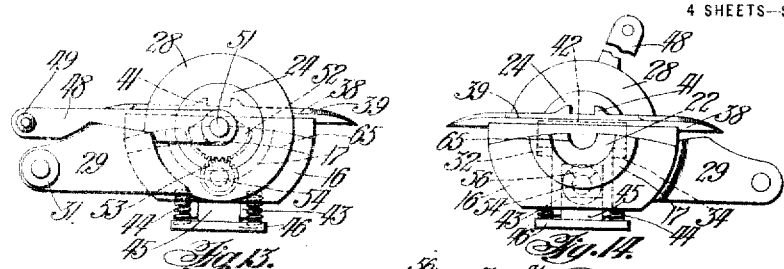
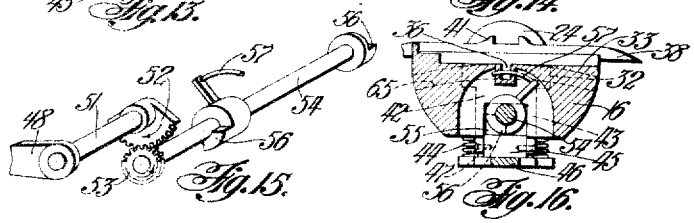
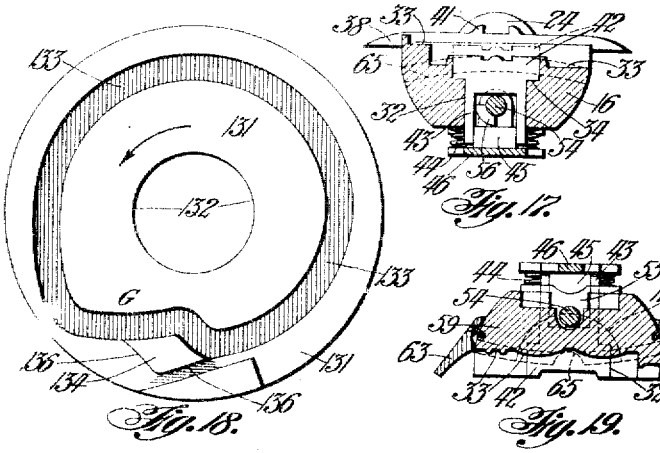
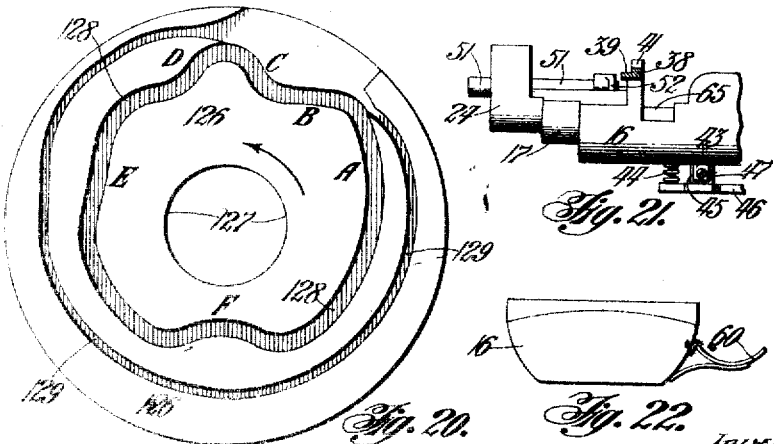
Inventors
O. J. Oakley
E. C. Hughes
Attorney O. J. OAKLEY & E. C. HUGHES.
MACHINE FOR MOLDING ROOFING TILES AND THE LIKE.
APPLICATION FILED JAN. 16, 1918.
1,267,331.
Patented May 21, 1918.
4 SHEETS—SHEET 4.
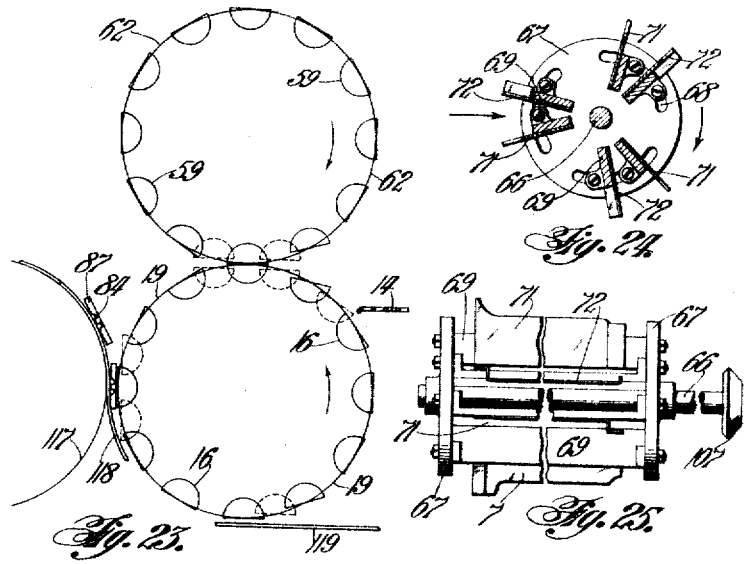

UNITED STATES PATENT OFFICE.

OLIVER J. OAKLEY, OF BRUNSWICK, MELBOURNE, AND ELDON C. HUGHES, OF FITZROY, MELBOURNE, VICTORIA, AUSTRALIA.

MACHINE FOR MOLDING ROOFING-TILES AND THE LIKE.

1,267,331. Specification of Letters Patent. Patented May 21, 1918.

Application filed January 16, 1918. Serial No. 212,065.

*To all whom it may concern:*

Be it known that we, OLIVER JOSEPH OAKLEY, a subject of the King of Great Britain and Ireland, residing in the city of Brunswick, a suburb of the city of Melbourne, in the county of Bourke, State of Victoria, Commonwealth of Australia, (whose post-office address is 356 Weston street, in the said city of Brunswick,) and ELDON CYRIL HUGHES, a subject of the King of Great Britain and Ireland, residing in the city of Fitzroy, a suburb of the city of Melbourne, in the county of Bourke, State of Victoria, Commonwealth of Australia, (whose post-office address is 44 Miller street, North Fitzroy, in the said city of Fitzroy,) have invented a certain new and useful Improved Machine for Molding Roofing-Tiles and the like, of which the following is a specification.

This invention relates to those machines which compress clay or other plastic or pliable material to form roofing tiles or other articles.

The object of the invention is to provide a simple and effective machine which will compress the material between two oscillatory molds, and in the case of tile making, form a hole through a lug which projects from the lower face of the tile for wiring which exudes from between the meeting it to a roof, and also cut off the excess clay surfaces of the two molds. The machine also transfers the molded article to a conveyer which carries it away for drying, seasoning or other purposes. By the invention both time and labor are saved and a continuous output of the article is maintained at a minimum cost.

But in order that this invention may be better understood reference will now be made to the accompanying sheets of drawings which are to be taken as part of this specification and read herewith:—

Figure 1 is a side elevation showing the general arrangement of the machine. For convenience of illustration all mold boxes are removed with the exception of one on the upper mold box supporting wheels. Upper and lower eccentric pathways and portions of the framework are also omitted for convenience of illustration.

Fig. 3 is a detail view of a rotary cutter by which plastic material is cut into equal lengths before passing to the molds.

Fig. 4 is a side elevation of Fig. 3.

Fig. 5 is a plan of a roofing tile produced by the machine.

Fig. 6 is a view looking underneath the tile.

Fig. 7 is an end view looking in the direction of the arrow in Fig. 5.

Fig. 8 is a view looking at the opposite end of the tile.

Fig. 9 is a side elevation of the tile showing the projecting lug and the hole formed therethrough by which the tile may be wired to a roof.

Fig. 10 is a plan of a lower mold box showing a major lever which oscillates the mold box and a minor lever which operates a core pin and ejectors.

Fig. 11 shows the manner in which the ends of the mold boxes are mounted in the supporting wheels.

Fig. 12 is a reverse plan of a lower mold box.

Fig. 13 is an end view looking in the direction of the arrow seen in Fig. 10. The minor lever is in its normal position and the ejectors are consequently withdrawn flush with the surface of the mold.

Fig. 14 is a view looking at the opposite end of the mold box seen in Fig. 10. The minor lever is lifted and the ejectors pushed outwardly.

Fig. 15 is a perspective view of the mechanism which operates the core pin and the ejectors of the lower mold boxes.

Fig. 16 is a section on line A—A of Fig. 10 the core pin being in the position it occupies during the molding of a tile.

Fig. 17 is a section on line B—B of Fig. 10. In full lines the ejector is shown withdrawn and in broken lines it is pushed outwardly.

Fig. 18 shows the eccentric pathway which controls the oscillation of the upper mold boxes and a director which operates the ejecting gear of said mold boxes. The view is taken in the opposite direction to that of Fig. 1 so that the direction of rotation is likewise reversed.

Fig. 19 is a cross section of an upper mold box, the ejectors being withdrawn.

Fig. 20 shows the eccentric pathways which control the oscillation of the lower mold boxes and the operation of the core pin and the ejectors of said mold boxes.

Fig. 21 is a side view of one end of a lower mold box the major and minor levers being removed.

Fig. 22 illustrates the use of a collecting pan attached to one side of each lower mold box to gather the surplus clay cut off from the sides of the tile.

Fig. 23 is a diagram showing the different positions which the mold boxes assume during rotation of the supporting wheels.

Fig. 24 is a cross section of a side fin cutter.

Fig. 25 is a view looking in the direction of the arrow in Fig. 24. Portions are broken away for convenience of illustration.

Fig. 26 is a detail view of an end fin cutter showing the spring by which the cutting disk is held to its work.

Fig. 27 is a view looking in the direction of the arrow in Fig. 26.

Fig. 28 shows the adjustable plate which carries the cutting disk removed from the lever.

Fig. 29 is a plan of a tile carrier.

Fig. 30 is a side view of Fig. 29.

Fig. 31 is an end view of Fig. 29.

Similar numerals of reference indicate similar or corresponding parts where they occur in the several views.

Figure 1:
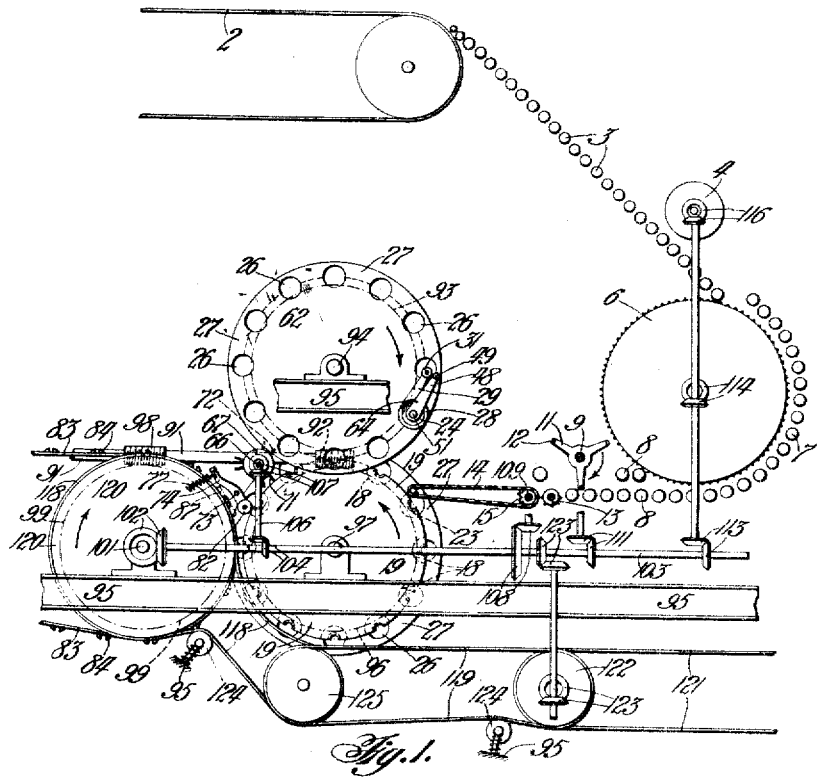

Clay emerging from a pug mill or the like in pieces of any suitable thickness and width is deposited upon the first moving belt 2. From this it is delivered on to the inclined rollerway 3 down which it slides and accumulates against a second or compression roller 4. After passing beneath this roller it emerges in a continuous strip or ribbon. It then passes on to a third ribbed roller 6 by which it is compressed against a series of fourth ribbed rollers 7 the ribs of which are not shown. After passing between the third and fourth rollers the clay is carried between fifth ribbed rollers 8. Adjacent the fifth rollers is a spindle 9 on which are two star wheels each having three projections 11. Between each opposite pair of projections extends a fine cutting wire 12 which moves against the ongoing clay and cuts it into strips of the desired length equal approximately to the width of the tile. The strip of clay is then picked up by a semi-spiked driven roller 13 which carries it on to a second moving belt or chain 14 driven by a sprocket 15.

By the belt 14 the clay is delivered onto one of a series of lower mold boxes 16 (Figs. 10 to 17). Each mold box has a semi-circular trunnion 17 at each end. These trunnions are adapted to oscillate within semi-circular beds 18 formed in the lower mold box supporting wheels 19 and 21. In one of the trunnions is a semi-circular recess 22 which accommodates a corresponding projection 23 on the wheel 19 to retain the end of the mold box in place. At the opposite end of the mold box is a reduced circular neck 24 which passes through a hole 26 formed in a flange 27 of the wheel. Attached to the neck 24 of each mold box and outside the flange 27 is a ring 28. This ring forms part of a major lever 29 by which the mold boxes are oscillated. On the outer end of each major lever is a roller 31 which traverses an eccentric pathway hereinafter referred to. Through each mold box are two ejector slots 32 one near each end of the mold face 33. In these slots are steps 34. Formed in the face of each lower mold near one end thereof is a recess 36 which molds a retaining lug 37 (Figs. 6 and 9) on the underneath face of the tile. Near each end of each lower mold box is a cross piece 38 forming a roller pathway 39. From each cross piece protrude carrier lugs 41.

In each ejector slot is an ejector 42 having legs 43. Each ejector is provided with steps which engage the steps 34 of the slots and limit the inward movement of the ejectors. Pressing against the bottom of the mold box are the inner ends of coiled springs 44 the outer ends of which press against a plate 46 having projections 45 secured to the legs 43 by screws 47 or other means (Fig. 21).

A minor or ejecting lever 48 which normally rests against the major lever 29 has on its outer end a roller 49 this lever is secured at its inner end to a first spindle 51 to which is secured a quadrant 52, this quadrant turns a pinion 53 carried by a second spindle 54 mounted in bearings 55. It also turns with the second spindle two ejecting cams 56 and a core pin 57 which pin, during molding passes through the retaining lug 37 before referred to and forms a hole 58 therein by which the tile is bound to the roof.

Figure 2:
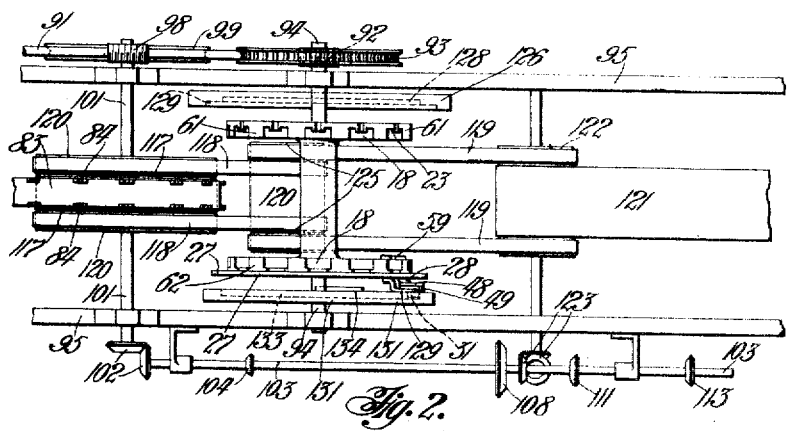
Fig. 2 is a plan of Fig. 1 parts being removed to show clearly the disposition of the transfer belts by which the finished tile is carried away from the machine. The upper and lower eccentric pathways are shown in position.

The upper mold boxes 59 (Fig. 19) are mounted on upper supporting wheels 61 and 62 (Figs. 1 and 2) in the same manner as the lower mold boxes. From the sides of the upper mold box protrude spue directors 63. The upper mold boxes have neither the roller paths 39, the carrier lugs 41, the recess 36, nor the core pin 57, but they are provided with levers and ejectors of the same character as those of the lower mold boxes and said ejectors are controlled in the same manner as already described. The minor ejecting levers of the upper mold boxes are normally held against their relative major levers by tension springs 64 (Fig. 1). The faces of the upper and lower mold boxes are recessed as at 65 to allow clearance for the projecting parts of the opposite mold boxes when the mold faces come together.

After the tile has been molded it encounters a side fin cutter which cuts off the fins formed by the material exuding between the molds on each side of the tile. This side fin cutter (Figs. 1, 24 and 25) includes a spindle 66 having thereon two disks 67. In the disks are slotways 68 to permit the adjustment of bars 69. To the bars are attached knives 71 and 72 which are of such contour that they trim off the fins and leave the sides of the tile smooth. The knives 71 trim off the leading edges of the tiles and the knives 72 the trailing edges. Collecting pans 60 (Fig. 22) may be attached to the sides of the mold boxes to receive the surplus material removed by the knives.

The molded tile next encounters end fin cutters (Figs. 1, 26, 27 and 28). One of these cutters is situated at each end of the tile. Protruding from the framework of the machine are studs 73. To each stud is pivoted a lever 74. This lever has at one end a lug 76 to which is connected one end of a spring 77. The other end of the spring is connected to the framework of the machine. The lever 74 supports a spindle 70 upon which turns a roller 75 which engages the pathway 39 of the lower mold boxes. To the said lever is attached a plate 78 having adjusting slots therein. Through these slots pass screws 79 which hold the plate to the lever. In the said plate turns a pin 81 which carries a rotary cutting disk 82.

Adjoining the lower series of molds is a carrier supplying belt 83. From this protrude carrier lugs 84 each opposite pair of which accommodates the slat 86 of a tile carrier 87 (Figs. 29 to 31). Upstanding from the top of each tile carrier is a rib 88 which engages the rear edge of the forwardly moving tile.

The driving mechanism is as follows:—A first shaft 91 has thereon a first worm 92 which turns a first worm wheel 93 situated upon a second shaft 94 which carries the upper mold box supporting wheels and is mounted in bearings on the framework 95. The first worm also turns a second worm wheel 96 situated upon a third shaft 97 which carries the lower mold box supporting wheels. Means may be provided for adjusting the supporting wheel shafts 94 and 97 to or from each other and also for adjusting the mold boxes radially on the supporting wheels. Upon the first shaft is a second worm 98 which drives a third worm wheel 99 upon a fourth shaft 101. The fourth shaft drives first bevel wheels 102 which turn a fifth shaft 103. Second bevel wheels 104 turn a sixth shaft 106 which operates third bevel wheels 107 turning the side fin cutter spindle 66. Fourth bevel wheels 108 drive a spindle 109 operating the second moving belt 14. The semi-spiked roller 13 being also driven from the spindle 109. A fifth pair of bevel wheels 111 drives a bevel wheel 112 (Fig. 4) on the cutter spindle 9. A sixth pair of bevel wheels 113 drive a seventh pair of bevel wheels 114 which drive the third ribbed roller 6 while an eighth pair of bevel wheels 116 drive the compression roller 4.

The carrier supplying belt 83 is driven by a pulley 117 (Fig. 2) on the fourth shaft 101. First transfer belts 118 pass over idle pulleys 120 and are driven by frictional contact with the lower mold boxes. Second transfer belts 119 pass over idle pulleys 125 and with a third transfer belt 121 are driven by a pulley 122 through ninth bevel wheels 123.

Tensioning rollers 124 may be employed as shown.

Facing the lower mold box supporting wheel 21 is a lower stationary plate 126 (see Fig. 20) having a central hole 127 to pass the shaft 97. In this plate is an inner eccentric pathway 128 in which run the rollers 31 of the major levers which oscillate the lower mold boxes. The plate is also provided with an outer eccentric pathway 129 in which run the rollers 49 of the minor levers which operate the core pin and ejectors of the lower mold boxes.

Facing the upper mold box supporting wheel 62 is an upper stationary plate 131 (see Fig. 18) having a central hole 132 to pass the shaft 94. Formed in the plate 131 is an eccentric pathway 133 in which run the rollers of the major levers which oscillate the upper mold boxes. At the bottom of this plate is a director 134 forming a pathway 136 which is followed by the rollers of the minor levers operating the ejectors of the upper mold boxes.

As a lower mold box approaches the feed belt 14 the roller of its respective major lever engages the straightened portion A of the eccentric pathway 128 which causes the mold box to become tilted as shown in Fig. 23 to receive the material from the belt. The respective minor lever has up to this point been separated from the major lever by the engagement of its roller with the pathway 129 and the core pin 57 is thus withdrawn. As the rollers approach the point A the converging of the two pathways brings the two levers closer together and thus moves the core pin into the molding position seen in Fig. 16 so that when the material is compressed in the mold the pin forms the hole 58 through the lug 37 which is molded within the recess 36. As the material is deposited on the face of the lower mold box the roller of the major lever approaches the horizontal portion B of the pathway 128. As the roller enters this portion of the pathway the face of the mold box is brought into a horizontal position as seen in Fig. 23, this position being maintained until after the compression of the tile between the upper and lower molds. The minor lever has now left the pathway 129 and is resting upon the major lever, the core pin being still in place.

As the upper and lower mold boxes separate from each other the roller 31 of the lower mold box encounters the inclined portion C of its pathway causing the mold to tilt and present the leading edge of the tile to the side fin cutters 71 which remove the overhanging fin on this side of the tile. As the roller 31 engages the portion D of the eccentric pathway the mold box is tilted in the opposite direction so that the trailing edge of the tile is presented to the side fin cutters 72 which remove the surplus material from this side of the tile. Particular attention is called to the fact that the side fin cutters 71 and 72 are rotated slowly, and in proper timed order, so that the above referred to operation may occur. The side fin cutters 71 and 72, receive rotation from a shaft 106, which is driven by a shaft 103. The shaft 103 is driven by a shaft 101, having a worm wheel 99 secured thereto, which is engaged and driven by a worm 98, carried by the common drive shaft 91. The shaft 91 carries the worm 92, which engages and drives the worm wheel 93. It is thus apparent that the side fin cutters and mold boxes are rotated in a timed order, for effecting the precise coaction, set forth in the specification. The end fin cutters are next encountered, the rollers 75 engaging the pathways 39 while the cutting disks 82 remove the surplus material from the tile ends. Meanwhile the roller of the minor lever has again entered the pathway 129 and the two levers are separated sufficiently to withdraw the core pin but not sufficiently to operate the ejectors.

As the roller 31 encounters the straightened portion E of the pathway the mold box assumes a vertical position to receive one of the carriers 87 at the point indicated in Fig. 23. The slit 86 of the carrier enters the space between the carrier lugs 41 on the mold box and the carrier moves along with the tile being thus transferred from the supply belt 83 to the first transfer belt 118. As the mold approaches the bottom of the wheel and the roller 31 engages the horizontal portion F of its pathway, the mold assumes a horizontal position face downward. At this point it will be seen that the pathways 128 and 129 diverge from each other thus separating the minor and major levers sufficiently to engage the cams 56 with the bottom of the ejectors which are thus forced outwardly and eject the tile on to the carrier. The carrier and tile are then conveyed along by the second transfer belts 119 on to the third transfer belt 121 which removes the tile to the locality desired. After the tile has been ejected the mold assumes its normal position and the ejectors are withdrawn by the springs 44 for the molding of the next tile. A positive withdrawal of the ejectors is assured by engagement of the cams 56 with the top of the projections 45 as the major and minor levers come together again.

The contour of the eccentric pathway 133 is such that the upper mold boxes retain their normal position until the rollers of the major levers approach the horizontal portion G of the pathway at which point the mold box is brought into a horizontal position face downward which position it retains until the tile has been compressed and the roller leaves the portion G of the pathway. Immediately after compression has taken place and the upper and lower mold boxes begin to separate the roller of the minor lever engages the director 134 and following the pathway 136 causes the ejectors to be forced outwardly thus ejecting the tile from the upper mold face on to the face of the lower mold. The minor lever is then returned to normal position by the spring 64. This spring is unnecessary in the case of the lower mold boxes as the minor levers are guided by the pathway 129 excepting at the top of the plate 126 where they simply rest upon the top of the major levers.

Although the invention has been particularly described as adapted to the molding of roofing tiles it is to be distinctly understood that it is not limited to such use and may be easily adapted to mold metallic or other articles from suitable moldable material.

Having now described our invention what we claim as new and desire to secure by Letters Patent is:—

1. In a machine for molding roofing tiles and other articles upper and lower mold supporting wheels, a series of oscillatory molds mounted upon the circumference of said wheels, means for oscillating said molds, including major pathways and major levers secured to the molds and engaging within the major pathways, ejectors within each of the mold boxes, minor eccentric pathways and minor levers engaging said pathways, a first spindle attached to the inner end of each minor lever, a second spindle gearing with the first spindle, cams carried by said second spindle and adapted to alternately force the ejectors outwardly and return them to normal position and springs acting against the outward movement of the ejectors.

2. In a machine for molding roofing tiles and other articles, upper and lower mold supporting wheels, a series of oscillatory molds mounted upon the circumference of said wheel, means for oscillating said molds, including major pathways and major levers secured to the molds and engaging within the major pathways, ejectors within each of the mold boxes, minor eccentric pathways, minor levers controlled by said pathways and adapted to operate said ejectors, a recess in the face of each lower mold and a core pin actuated by the respective minor lever and adapted to pass through said recess during the molding of the tile and be withdrawn after molding.

3. In a machine for molding roofing tiles and other articles upper and lower supporting wheels, a series of oscillatory molds mounted upon the circumference of said wheels, means for oscillating said molds so that the face of corresponding upper and lower molds are disposed parallel to each other for a predetermined period during which the compression of the article takes place, side fin cutters operating against the lower mold faces and means for oscillating the lower molds to successively present the leading and trailing edges of the molded article to said cutters.

4. In a machine for molding roofing tiles and other articles, upper and lower mold supporting wheels, a series of oscillatory molds mounted upon the circumference of said wheels, means for oscillating said molds so that the faces of corresponding upper and lower molds are disposed parallel to each other for a predetermined period during which the compression of the article takes place, a roller pathway at each end of the lower mold boxes, end fin cutters each comprising an intermediately pivoted lever, a roller carried by said lever and adapted to engage one of said pathways, a cutting disk adapted to cut surplus material from the end of the article and a spring holding said cutting against the face of the mold.

5. In a machine for molding roofing tiles and other articles, upper and lower mold supporting wheels, a series of oscillatory molds mounted upon the circumference of said wheels, means for oscillating said molds so that the faces of the corresponding upper and lower molds are disposed parallel to each other for a predetermined period during which the compression of the article takes place, carrier lugs protruding from each end of the lower mold faces, a carrier having a slat adapted to be accommodated by said carrier lugs, a carrier supply belt for conveying the carriers to the lower molds and means for oscillating the lower mold boxes so that their faces are parallel with the carriers during transference of the carrier from the supply belt to the mold.

6. In a machine for molding roofing tiles and other articles, upper and lower mold supporting wheels, a series of oscillatory molds mounted upon the circumference of said wheels, means for oscillating said molds so that the faces of the corresponding upper and lower molds are disposed parallel to each other for a predetermined period during which the compression of the article takes place, carrier lugs protruding from each end of the lower mold faces, a carrier having a slat adapted to be accommodated by said carrier lugs, a carrier supply belt for conveying the carriers to the lower molds, first transfer belts adapted to transfer the carriers from the supply belt and second transfer belts to transfer the carriers from the first transfer belts on leaving the lower molds.

7. In a machine for molding roofing tiles and other articles the combination of an inclined rollerway, a compression roller adjacent said rollerway a large roller at the bottom of the rollerway, a series of small rollers disposed around said large roller, a rotary cutter beyond said rollers, said cutter being adapted to cut the material into regular strips, a feed belt beyond said rotary cutter, a semi-spiked roller between said feed belt and said cutter, lower mold supporting wheels adjacent the delivery end of said belt, a series of lower oscillatory mold boxes carried by said supporting wheels, upper mold supporting wheels, upper oscillatory molds carried by said upper supporting wheels, means for independently oscillating each of said mold boxes, ejectors in each mold box, side fin cutters and end fin cutters adapted to engage the tile after passing between the upper and lower mold boxes, a pulley adjacent the path of the lower molds, a carrier supply belt and a first transfer belt passing over said pulley, second transfer belts beneath the lower mold box supporting wheels and third transfer belts adapted to receive the tile from the second transfer belts.

8. In a machine of the character described, a mold having an apertured pocket, a movable ejector associated with the mold to force the molded article therefrom, a pin adapted for movement within the pocket through the apertures thereof, and common means to move the ejector and pin in timed order.

9. In a machine of the character described, a mold having an apertured pocket, an ejector movable transversely of the mold, a pin adapted for movement within the pocket through the aperture thereof, a rock-shaft, a crank connected with the rock-shaft and having the pin secured thereto, a cam carried by the rock-shaft and engaging the ejector to move the same, and means to turn the rock-shaft.

10. In a machine of the character described, a mold having a pocket, a pair of ejectors mounted to reciprocate transversely of the mold, a longitudinally curved pin adapted to move transversely of and within the pocket, a rock-shaft, a crank secured to the rock-shaft and carrying the longitudinally curved pin, a pair of cams secured to the rock shaft and adapted to contact with the ejectors to shift the same to the outer position, springs to shift the ejectors to the inner position, and means to turn the rock-shaft.

In testimony whereof we affix our signatures.

OLIVER J. OAKLEY.
ELDON C. HUGHES.

Witness:
CECIL W. L. ELASTNER.